(12) United States Patent
Hasida

(10) Patent No.: US 10,846,243 B2
(45) Date of Patent: Nov. 24, 2020

(54) ACCESS MANAGEMENT METHOD, INFORMATION PROCESSING DEVICE, PROGRAM, AND RECORDING MEDIUM

(71) Applicant: Assemblogue, Inc., Tokyo (JP)

(72) Inventor: Koiti Hasida, Tokyo (JP)

(73) Assignee: Assemblogue, Inc., Tokyo (JP)

( * ) Notice: Subject to any disclaimer, the term of this patent is extended or adjusted under 35 U.S.C. 154(b) by 103 days.

(21) Appl. No.: 16/087,596

(22) PCT Filed: Mar. 22, 2017

(86) PCT No.: PCT/JP2017/011350
§ 371 (c)(1),
(2) Date: Sep. 21, 2018

(87) PCT Pub. No.: WO2017/164212
PCT Pub. Date: Sep. 28, 2017

(65) Prior Publication Data
US 2019/0108142 A1 Apr. 11, 2019

(30) Foreign Application Priority Data
Mar. 22, 2016 (JP) .................................. 2016-057302

(51) Int. Cl.
*G06F 12/14* (2006.01)
*G06F 21/62* (2013.01)
(Continued)

(52) U.S. Cl.
CPC ...... *G06F 12/1458* (2013.01); *G06F 16/9024* (2019.01); *G06F 21/62* (2013.01); *H04L 9/08* (2013.01); *H04L 9/32* (2013.01)

(58) Field of Classification Search
CPC combination set(s) only.
See application file for complete search history.

(56) References Cited

U.S. PATENT DOCUMENTS

2005/0086213 A1 4/2005 Terao
2010/0257204 A1 10/2010 Orlov et al.
(Continued)

FOREIGN PATENT DOCUMENTS

JP 2001127748 A 5/2001
JP 2002149610 A 5/2002
(Continued)

OTHER PUBLICATIONS

International Search Report for PCT/JP2017/011350 dated Jun. 27, 2017.

*Primary Examiner* — Yong J Choe

(57) ABSTRACT

To appropriately access various portions of a concealed graph while suppressing a processing load. Provided is an access management method in which a computer including a control unit performs access management of a graph comprising nodes and directed links between the nodes. The control unit determines, in response to an attempt to access a node N, whether a completeness condition, which indicates that complete access information that is access information with which it is possible to access the node N can be obtained, is satisfied, by combining pieces of access information which have been acquired before accessing the node N. The control unit permits access to the node N from a node M when the completeness condition is satisfied. The control unit suspends access to the node N from the node M when the completeness condition is not satisfied.

7 Claims, 10 Drawing Sheets

(51) Int. Cl.
*H04L 9/08* (2006.01)
*G06F 16/901* (2019.01)
*H04L 9/32* (2006.01)

(56) References Cited

U.S. PATENT DOCUMENTS

2011/0138109 A1 6/2011 Liu et al.
2012/0158800 A1 6/2012 Peters et al.

FOREIGN PATENT DOCUMENTS

| JP | 2005122493 A | 5/2005 |
| JP | 2005339008 A | 12/2005 |
| JP | 2007133575 A | 5/2007 |
| JP | 200926237 A | 2/2009 |
| JP | 2012523050 A | 9/2012 |

US 10,846,243 B2

ACCESS MANAGEMENT METHOD, INFORMATION PROCESSING DEVICE, PROGRAM, AND RECORDING MEDIUM

CROSS-REFERENCE TO RELATED APPLICATION

This application is a U.S. National Stage of PCT/JP2017/011350 filed Mar. 22, 2017, which claims priority to and the benefit of Japanese Patent Application No. 2016-057302, filed on Mar. 22, 2016, the disclosures of which are incorporated herein by reference in their entirety.

TECHNICAL FIELD

The present invention relates to an access management method, an information processing device, a program, and a recording medium.

BACKGROUND ART

When data related to the privacy of an individual person or the confidentiality of a company is shared with someone, certain concealing is required to impose access restrictions on an administrator of a sharing server.

As a method for using concealed data, techniques such as privacy preserving data mining (PPDM) are known (for example, see Patent Document 1).

CITATION LIST

Patent Document

Patent Document 1: Patent Publication US-A-2011-0138109 (Specification)

SUMMARY

Technical Problem

However, in the conventional PPDM, the types of operations on data are limited and processing overhead is large. Moreover, it is desirable to be able to access various portions of the access-restricted data appropriately.

Therefore, certain aspects of the present invention are made in view of the above-described problems, and enable various portions of a concealed graph to be accessed appropriately while suppressing a processing load.

Solution to Problem

An access management method according to an aspect of the present invention is an access management method in which a computer including a control unit performs access management of a graph comprising nodes and directed links between the nodes. The control unit determines, in response to an attempt to access a node N, whether a completeness condition, which indicates that complete access information that is access information with which it is possible to access the node N can be obtained, is satisfied, by combining pieces of access information which have been acquired before accessing the node N. The control unit permits access to the node N when the completeness condition is satisfied. The control unit suspends access to the node N when the completeness condition is not satisfied. The above-described problems can be solved by allowing multiple information processing devices including a sharing server to share a concealed graph and restricting the above-described access control in each sharing server to some part of the graph.

DESCRIPTION OF EMBODIMENTS

Figure 1:
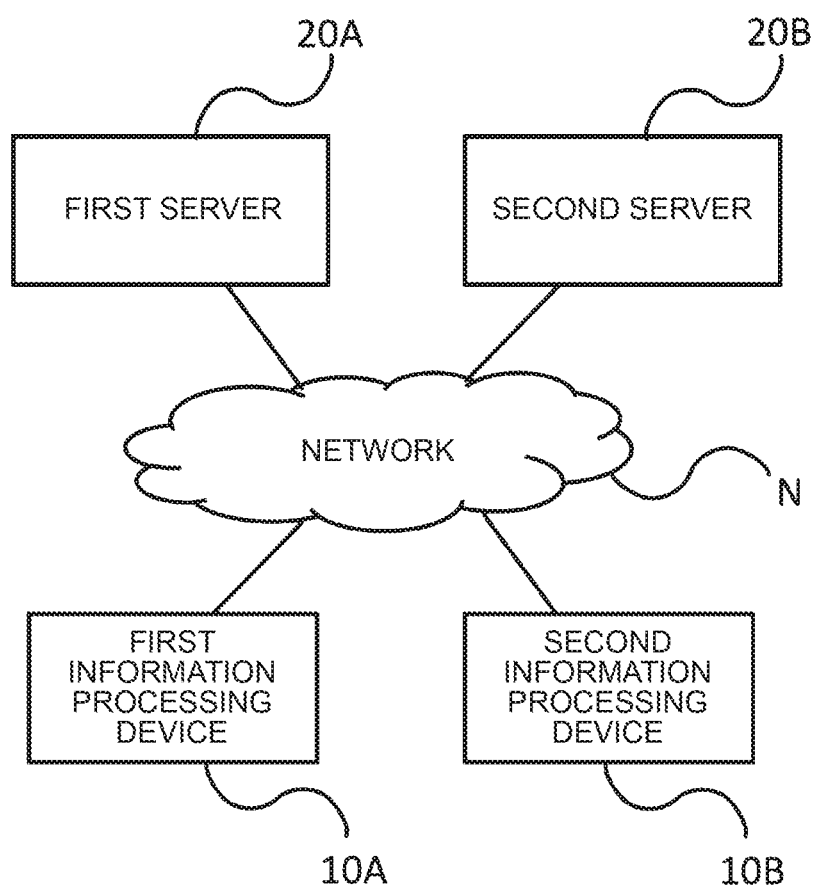
FIG. 1 is a diagram illustrating an example of a schematic configuration of an information processing system according to an embodiment.

Hereinafter, an embodiment of the present invention will be described in detail with reference to the accompanying drawings. First, terms will be defined.

A "sharing server" is an information processing device that relays data between multiple users so as to share the data. For example, a sharing server may be a server such as a cloud and a personal terminal. "Access" refers to reading data as a plain text. "Concealing" refers to modifying data so that a nontrivial operation is required to access the data. For example, concealing includes encryption, secret sharing, and the like.

A "graph" refers to data comprising nodes and directed links between nodes. Each link connects a starting node and an ending node. A node and a link contain certain additional information. In the following description, it will be described that each link is embedded in the starting node. Moreover, it will be described that the content of each node is concealed in a sharing server. The content of a node refers to information contained in the node. A link that starts from a node M and ends at a node N will be also referred to as a "link from M to N" or a "link MN". Moreover, a link that starts from a node M will be also referred to as a "link from M", and a link that ends at a node N will be referred to as a "link from N".

"Data reachable from a node" refers to a graph made up of the node and links and nodes reachable by following links in a forward direction from the node. "Access information of data" refers to information used for accessing links and nodes that form the data. Access information is the following types of information and a combination thereof, for example.

Address (path, URL, and the like in a file system)

Encryption scheme and information on decryption key when data is encrypted

Location information of shared data when data is secret-shared

Account information (user ID, password, and the like) when login is required to access data API token when API is used to access data Data ID (URL thereof or the like when data is positioned in cloud storage)

If it is possible to access a node N by using certain access information x, x is said to be complete for N. That is, if the access information x is complete for N, it is possible to view and edit information contained in the node N by using x.

A combination of multiple pieces of access information that are incomplete for the node N may be complete for N. For example, concatenation of pieces of data contained in multiple pieces of access information or XOR of respective bits may be the key for decrypting information contained in the node N.

"Rights description information" refers to information on the rights of data users. For example, the following rights description information may be considered.

Can browse data if predetermined cost is paid.

Can browse data for predetermined purpose.

Can edit data.

Can provide data to other persons who satisfy predetermined conditions.

Can get discount if you present data when shopping.

Embodiment

<System Configuration>

FIG. 1 illustrates an example of a schematic configuration of an information processing system 1 according to an embodiment. In the information processing system 1 illustrated in FIG. 1, for example, a first information processing device 10A, a second information processing device 10B, a first server 20A, and a second server 20B are connected via a cable or wireless network N such as a broadband line.

The first information processing device 10A is a personal computer (PC), for example, and processes data. The second information processing device 10B is a smartphone, for example, and processes data. The information processing devices will be denoted by reference numeral 10 when it is not necessary to distinguish both devices.

The first server 20A is a PC, for example, and the second server 20B is a smartphone, for example. In the following description, the two servers will be denoted by reference numeral 20 when it is not necessary to distinguish both servers. The server 20 has a role of a sharing server, and receives and retains data and transmits retained data by being accessed from the first information processing device 10A and the second information processing device 10B. The server 20 may be the same as the first information processing device 10A and the second information processing device 10B.

The server 20 stores data corresponding to each node and each link of a graph. Examples of the data corresponding to each node of a graph include an address, the name, a medical history, a work history, and a purchase history of an individual person, the internal information of a company, video data such as movies, and test data such as books.

<Hardware Configuration>

Figure 2:
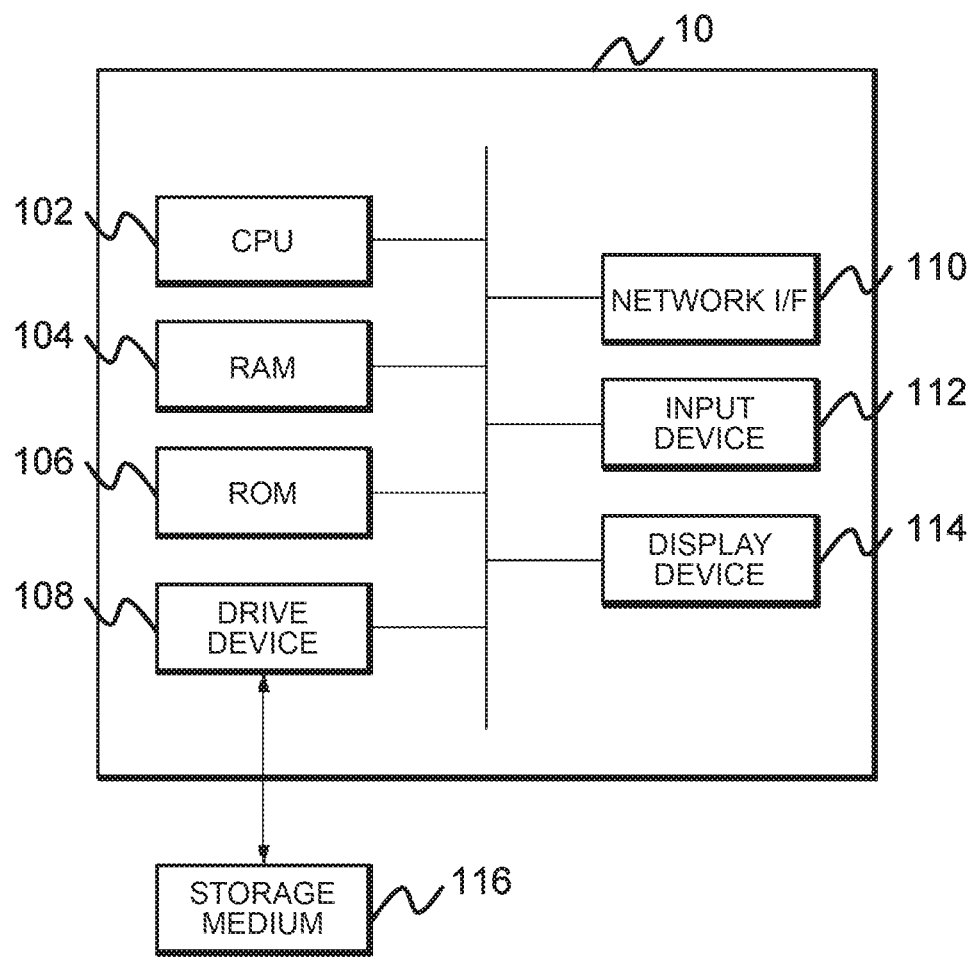
FIG. 2 is a block diagram illustrating an example of a schematic hardware configuration of an information processing device according to an embodiment.

Next, a hardware configuration of the information processing device 10 will be described. FIG. 2 is a block diagram illustrating an example of a schematic hardware configuration of the information processing device 10 according to the embodiment.

As illustrated in FIG. 2, the information processing device 10 comprises a central processing unit (CPU) 102, a random access memory (RAM) 104, a read only memory (ROM) 106, a drive device 108, a network I/F 110, an input device 112, and a display device 114. These respective components are connected so as to be able to transmit and receive data to and from each other via a bus.

The CPU 102 is a control unit that controls respective devices and computes and processes data within a computer. The CPU 102 is an arithmetic device that executes programs stored in the RAM 104 or the ROM 106. The CPU 102 receives data from the input device 112, the network I/F 110, and the like, computes and processes the data, and outputs computation results to the display device 114, a storage device, and the like.

The RAM 104 is a main storage unit or the like, for example. The RAM 104 is a storage device that stores or temporarily preserves data and programs such as application software and an operating system (OS) which is basic software executed by the CPU 102.

The ROM 106 is a storage device that stores data related to application software or the like, for example.

The drive device 108 reads a program from a recording medium 116 (for example, a CD-ROM or an SD card) and installs the program in a storage device.

The recording medium 116 stores a predetermined program, and the program stored in the recording medium 116 is installed on the information processing device 10 via the drive device 108. The installed predetermined program can be executed by the information processing device 10.

The network I/F 110 is an interface to the information processing device 10 and a peripheral device having a communication function. Moreover, the network I/F 110 is connected via the network N such as a local area network (LAN) or a wide area network (WAN) constructed by a data transmission path such as, for example, a cable and/or wireless line.

The input device 112 comprises a keyboard including cursor keys, number input keys, and various functional key, and a mouse, a slide pad, and the like for selecting keys on a display screen of the display device 114. Moreover, the input device 112 is a user interface for a user to give an operation instruction to the CPU 102 and, and to input data.

The display device 114 is configured as, for example, a liquid crystal display (LCD) and displays information corresponding to display data input from the CPU 102. The input device 112 and the display device 114 may be provided outside the information processing device 10.

The server 20 has a configuration similar to that illustrated in FIG. 2 and may further equip a hard disk drive (HDD) or the like and need not equip the input device 112 and the display device 114.

<Functional Configuration>

Figure 3:
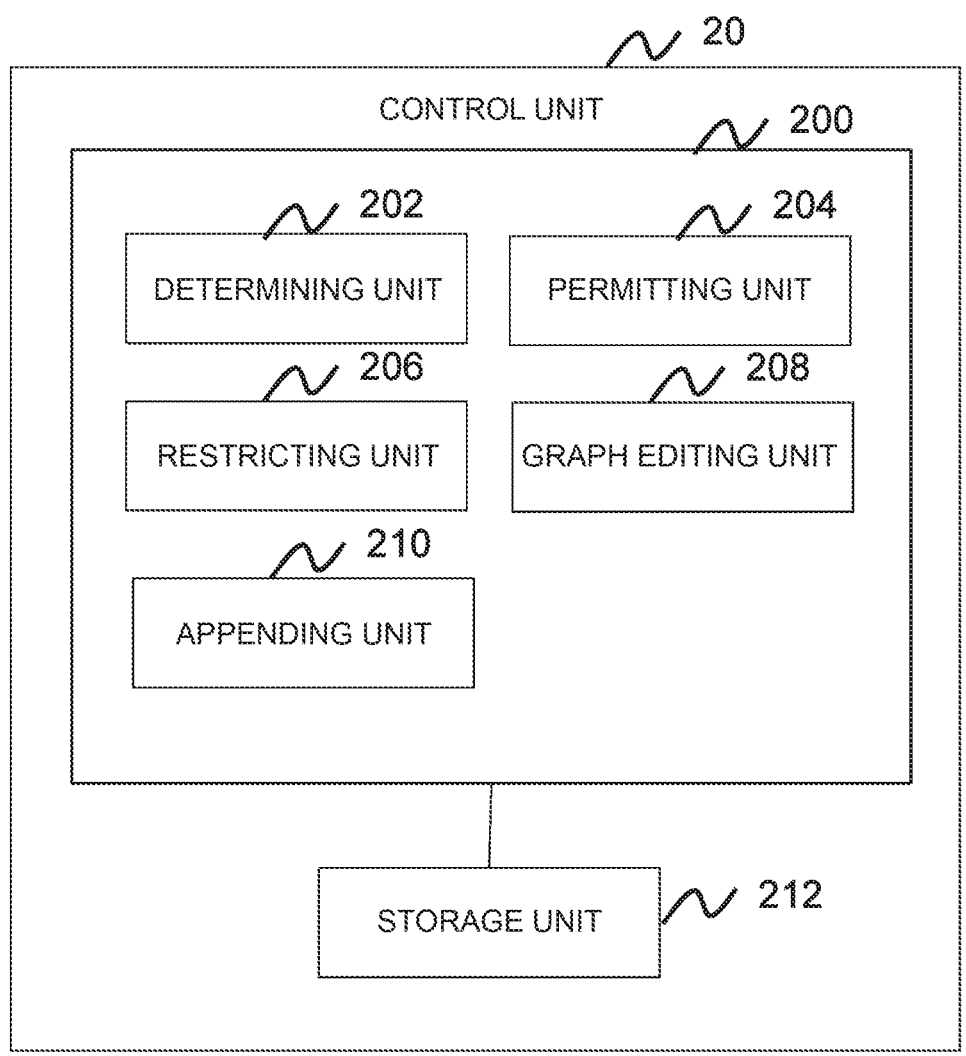
FIG. 3 is a block diagram illustrating an example of a functional configuration of a server according to an embodiment.

Next, a functional configuration of the server 20 will be described. The server 20 determines whether access will be permitted in response to an access request from the information processing device 10. FIG. 3 is a block diagram illustrating an example of a functional configuration of the server 20 according to the embodiment. The server 20 illustrated in FIG. 3 equips a control unit 200 and a storage unit 212. The control unit 200 equips at least a determining unit 202, a permitting unit 204, a restricting unit 206, a generating unit 208, and an appending unit 210.

The control unit 200 may be realized, for example, by the CPU 102, the RAM 104 as a work memory, the network UF 110, and the like. The control unit 200 has a function of performing access management to be described later when a program is executed.

The storage unit 212 may be realized, for example, by the RAM 104, the ROM 106, a HDD, and the like. The storage unit 212 stores data processed by the control unit 200 and stores protection target information and the like which uses graphs acquired from other devices.

Here, it is assumed that the control unit 200 has received an access request from the information processing device 10. The access request is a request for access to a node N. Moreover, access information on data reachable from N is contained in the node N and each link to the node N.

The determining unit 202 determines, in response to an attempt to access the node N from a node M, whether a completeness condition, which indicates that access information complete for the node N (access information with which it is possible to access the node N without using other access information) can be obtained, is satisfied, by combining pieces of access information contained in accessed nodes and links.

Here, when it is possible to access N by using only certain access information for the node N, the access information is referred to as access information (first access information) that is complete for N. Moreover, when it is not possible to access N by using only certain access information for the node N, the access information is referred to as access information (second access information) that is incomplete for N.

For example, the determining unit 202 determines that the completeness condition is satisfied if access information that is complete for N is contained in a link MN. Moreover, even when the access information contained in the link MN is incomplete for N, if a combination of pieces of access information contained in other, already accessed links (for example, pieces of access information in links LN and KM) and the access information contained in the link MN is access information that is complete for N, the determining unit 202 determines that the completeness condition is satisfied. In order to determine whether the completeness condition is satisfied for the node N, it is necessary to examine whether a combination of pieces of access information contained in several nodes and links will be access information that is complete for N. In this case, by forming a graph such that it is only necessary to examine nodes and links within a range where N can be reached by following k or fewer links in a forward direction, for example, the determining unit 202 can determine the completeness condition easily. For example, by associating identification information meaning that "this access information will be complete when combined with pieces of access information contained in other links to the node N" with the link MN, it is possible to identify that the access information of the link MN is incomplete. Moreover, if the node N can be accessed only when combining pieces of access information of the links MN and LN, in order to access the node N, it is necessary to first access both nodes L and M and then access the links LN and MN. That is, the node N can be accessed only when there are access requests from the nodes M and L.

The permitting unit 204 permits access to the node N when the completeness condition for the node N is satisfied. For example, the permitting unit 204 permits access to the node N if the access information contained in the link MN is complete for N. When access is permitted, a user can browse the content of the node N in a plain text.

The restricting unit 206 suspends access to the node N when the completeness condition for the node N is not satisfied.

In this way, by appropriately including pieces of access information to nodes and links, it is possible to appropriately access various portions of an access-restricted graph by distinguishing accessible portions and non-accessible portions.

Figure 4:
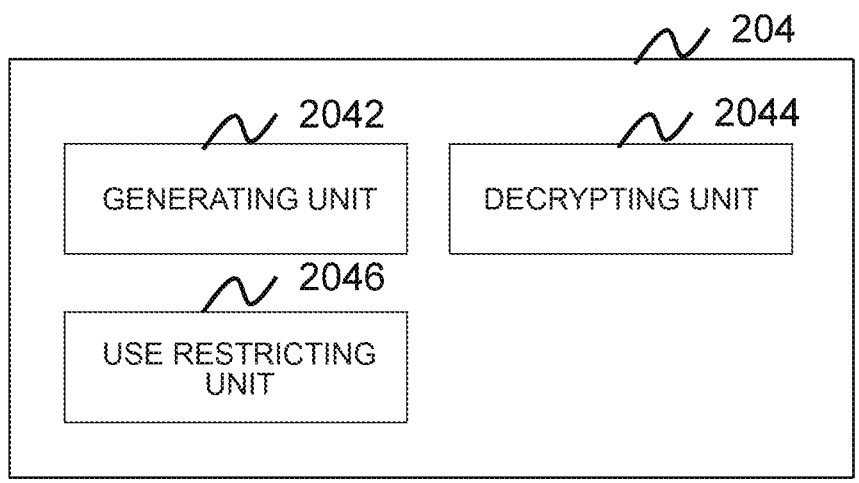
FIG. 4 is a diagram illustrating an example of a detailed configuration of a permitting unit.

Here, a detailed configuration of the permitting unit 204 will be described with reference to FIG. 4. FIG. 4 illustrates an example of a detailed configuration of the permitting unit 204. The permitting unit 204 equips a generating unit 2042, a decrypting unit 2044, and a use restricting unit 2046. The generating unit 2042 generates complete access information from multiple pieces of incomplete access information. For example, the generating unit 2042 generates a key for decrypting the content of a node by XOR of respective bits of multiple pieces of access information.

The decrypting unit 2044 reveals the content of a node by using the generated complete access information. For example, if it is possible to generate access information that is complete for the node N from one or more pieces of access information (if the completeness condition is satisfied), the decrypting unit 2044 reveals the content of the node N by using the complete access information.

The generating unit 2042 generate one item of access information on the basis of one or more pieces of access information. For example, when the complete access information is concatenation of multiple pieces of incomplete access information or XOR of respective bits, the generating unit 2042 collects those pieces of incomplete access information to generate complete access information.

The permitting unit 204 permits access to the node by using the generated complete access information. In this way, since information contained in the node can be concealed unless complete access information is obtained, it is possible to improve the ability to conceal information contained in the node.

When rights description information on the right of data user is contained in accessed data, the use restricting unit 2046 restricts the use of the content of the node on the basis of the rights description information. For example, the use restricting unit 2046 restricts the use such as browsing or editing. In this way, it is possible to permit access to the content of a node and to restrict the use of the content.

Returning to FIG. 3, a graph editing unit 208 generates a node O, for example, and generates a link NO which is a link from the node N to the node O.

The appending unit 210 appends, to the link NO, access information for data reachable from the node O. In this way, it is possible to supplement the graph appropriately.

Moreover, the graph editing unit 208 may remove nodes and links in a graph.

FIRST EXAMPLE

Next, a first example of the above-described embodiment will be described. For example, in the first example, the control unit 200 performs the following access management.

Figure 5:
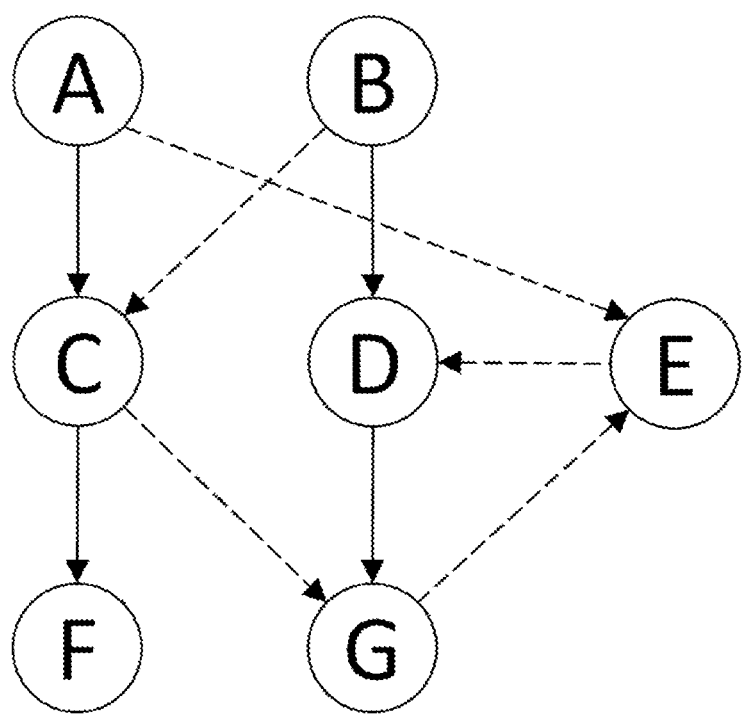
FIG. 5 is a diagram illustrating an example of a graph according to a first example.

FIG. 5 illustrates an example of a graph according to the first example. In the graph illustrated in FIG. 5, access information contained in a link indicated by a broken line is incomplete for the ending node thereto. That is, it is not possible to access ending-point data by using the access information only. Moreover, access information contained in a solid-line link becomes access information complete for the ending node of a broken-line link starting from the ending node of the solid-line link when combined with access information contained in the broken-line link.

That is, it is not possible to follow two broken-line links successively. For example, when access information that is complete for a node A is provided to a user a, first, the user a accesses the node A and then accesses the node C by following the solid-line link AC. After that, the user a can access the node F (can read the content of the node F) by using access information obtained by combining access information contained in the link AC and access information contained in the link CF. This access management is performed by the control unit 200.

The user a can access the node G by using access information obtained by combining the access information contained in the link AC and access information contained in the link CG. Moreover, if access information that is complete for the node E when combined with access information contained in the link AE is provided to the user a, the user a can access the node E by following the link AE. On the other hand, since access information contained in the link ED is incomplete for the node D and there is no access information that supplements this access information, the user a cannot access the node D (cannot read the content of the node D).

When access information that is complete for the node C when combined with the access information complete for the node B and the access information contained in the link BC is provided to the user, the user can access the node C from the node B but cannot access the nodes F and G from the node C. Moreover, the user can access the nodes D, G, and E from the node B.

In order to create a node C, a link from the node C, and a link to the node C in a state where the node C and these links are not present, the graph editing unit 208 follows the following procedure.

1. Create a node C.
2. Create a link BC including access information that is incomplete for the node C.
3. Create a link CF including access information that is incomplete for a node F.
4. Create a link CG including access information that is incomplete for a node G.
5. Create a link AC including access information that is complete for the node F when combined with access information contained in the link CF, that is complete for the node G when combined with the access information contained in the link CG, and that is complete for the node C.

When there are multiple links from a certain node, access information that is incomplete for the ending node of each link may be complete access information by being combined with certain common access information. In this case, a process of obtaining complete access information by combining pieces of incomplete access information and obtaining incomplete access information contained in links is simplified.

In the above-described example, links AC, CF, and CG may contain pieces of data x, y, and z as part of access information, XOR of respective bits of x and y may be the key of F, XOR of respective bits of x and z may be the key of G.

Here, x is access information that is incomplete for the nodes F and G contained in the link AC. y is access information that is incomplete for the node F contained in the link CF. z is access information that is incomplete for the node G contained in the link CG. y and z become access information that is complete for the nodes F and G, respectively, by being combined with common access information x.

SECOND EXAMPLE

Next, a second example of the above-described embodiment will be described. For example, in the second example, the control unit 200 performs the following access management. It is assumed that information contained in each node is concealed by using access information contained in one or more links of the node.

When a company A contains departments B and C, the department B contains sections D and E, and the department C contains sections F and G, a graph including nodes A, B, C, D, E, F, and G respectively corresponding to the company A, the departments B and C, and the sections D, E, F, and G is generated.

Figure 6:
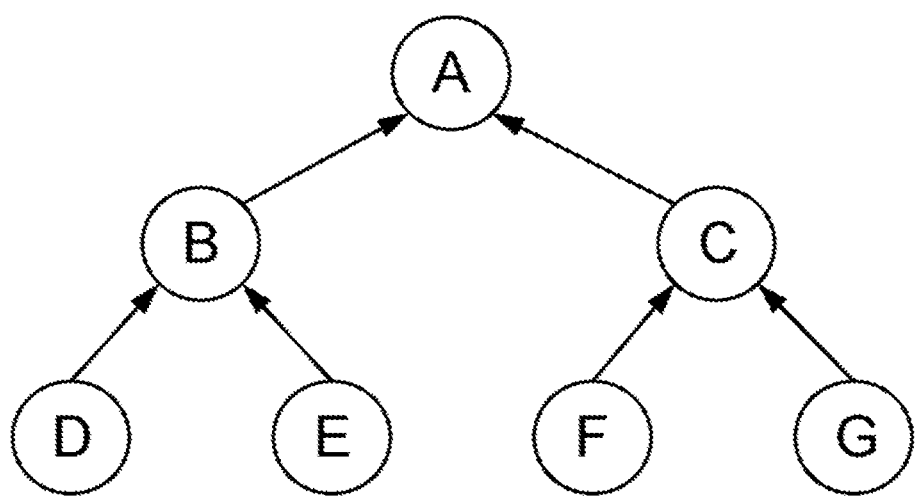
FIG. 6 is a diagram illustrating an example of a graph according to a second example.

FIG. 6 illustrates an example of a graph of the second example. In the example illustrated in FIG. 6, each link contains access information that is complete for the ending node thereof. In this case, when access information for the node of each section is provided to the members of the section, the respective members of the section D, for example, can access the nodes A, B, and D only.

That is, when information shared within a department indicated by each node is contained in the node, respective members can only access information shared within the department to which the members belong. In this way, when data of a company is concealed and positioned in an external server, respective pieces of the data can be shared by respective departments of the company without being revealed to an administrator of the server.

THIRD EXAMPLE

Next, a third example of the above-described embodiment will be described. For example, in the third example, the control unit 200 performs the following access management.

Figure 7:
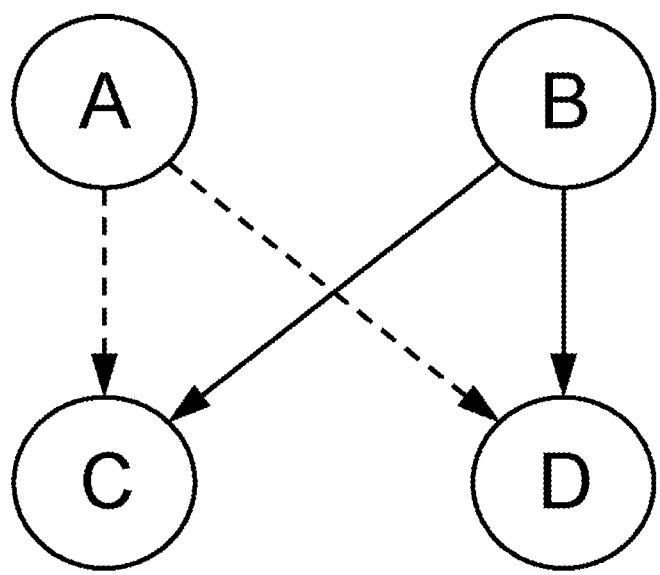
FIG. 7 is a diagram illustrating an example of a graph according to a third example.

FIG. 7 illustrates an example of a graph according to the third example. In the example illustrated in FIG. 7, it is assumed that nodes A and B of the graph are albums and nodes C and D contain picture data. Moreover, a broken-line link contains rights description information indicating that it is possible to only display picture data of the ending node thereof, and a solid-line node contains rights description information indicating that the picture data of the ending node thereof can be used arbitrarily. Moreover, any link contains access information that is complete for the ending node.

In this case, when a user provided with access information complete for the node A issues an access request to the server 20 by using the information processing device 10, the user is permitted to browse the picture data of the nodes C and D but is not permitted to store the picture as unconcealed data or transmit the same to outside.

On the other hand, when a user provided with the access information complete for the node B issues an access request by using the information processing device 10, no restriction on the use of the picture data of the nodes C and D is imposed on the user.

FOURTH EXAMPLE

Next, a fourth example of the above-described embodiment will be described. For example, in the fourth example, the control unit 200 performs the following access management.

Figure 8:
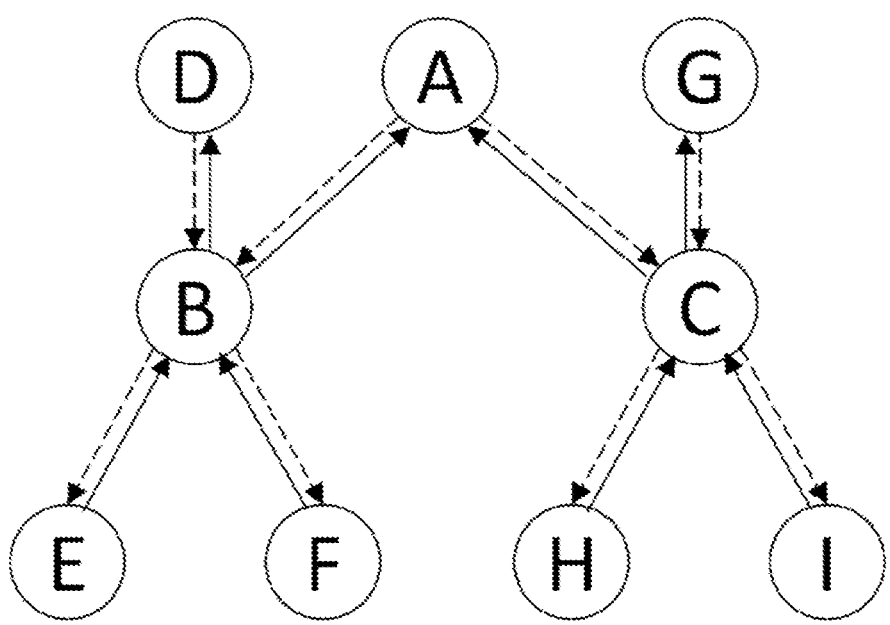
FIG. 8 is a diagram illustrating an example of a graph according to a fourth example.

FIG. 8 illustrates an example of a graph according to the fourth example. In the example illustrated in FIG. 8, a solid-line link contains access information that is complete for the ending node thereof. On the other hand, the access information contained in a broken-line link is incomplete for the ending node N thereof and becomes complete for the node N when combined with access information contained in a broken-line link to the starting node thereof.

Therefore, a user can access an ending node of a broken-line link from the starting node thereof if the user can access the broken-line link.

Moreover, the node A corresponds to an administrator of a certain service, the nodes B and C correspond to information on customer groups, the nodes D and G correspond to information on staffs responsible for the customer groups corresponding to the nodes B and C, respectively, the nodes E and F correspond to information on customers belonging to the customer group corresponding to the node B, and the nodes H and I correspond to information on customers belonging to the customer group corresponding to the node C.

It is assumed that each person is provided with such access information that is complete for the ending node of a broken-line link from a node corresponding to the person when combined with access information that is complete for a node corresponding to the person and access information contained in the broken-line link from the node.

In this case, it is possible to follow links downward, follow links upward, and follow links downward and then upward within the graph. However, it is not possible to follow links upward and then downward.

For example, since the administrator is provided with access information for the node A and access information that is complementary for the nodes B and C, the administrator can access information on all nodes.

Moreover, each staff can access only information on the customer group that the staff is responsible for and customers belonging to the customer group and the administrator. For example, each staff can access the node B by following the broken-line link from the node D and access the nodes A, E, and F from the node B. However, each staff cannot access the node C via the node A.

Furthermore, each customer can access information on the administrator and the staff responsible for the group to which the customer belongs. For example, each customer can access the node B by following a solid-line link from the node E and access the nodes A and D by following a solid-line link from the node B. On the other hand, each customer cannot access the node F by following a broken-line link from the node B or access the node C by following a broken-line link from the node A.

FIFTH EXAMPLE

Next, a fifth example of the above-described embodiment will be described. For example, in the fifth example, the control unit 200 performs the following access management.

Figure 9:
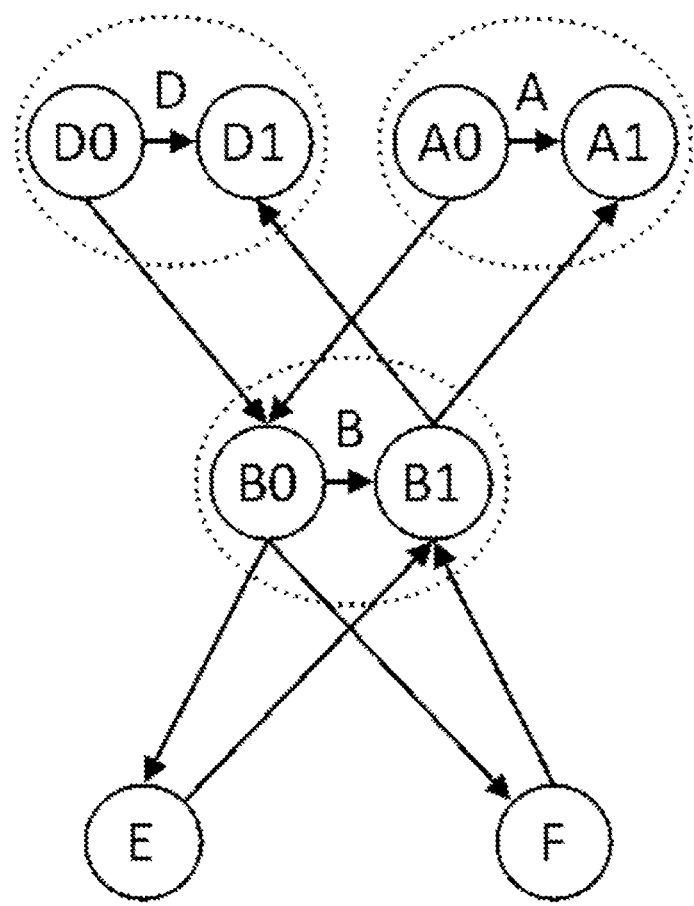
FIG. 9 is a diagram illustrating an example of a graph according to a fifth example.
Figure 10:
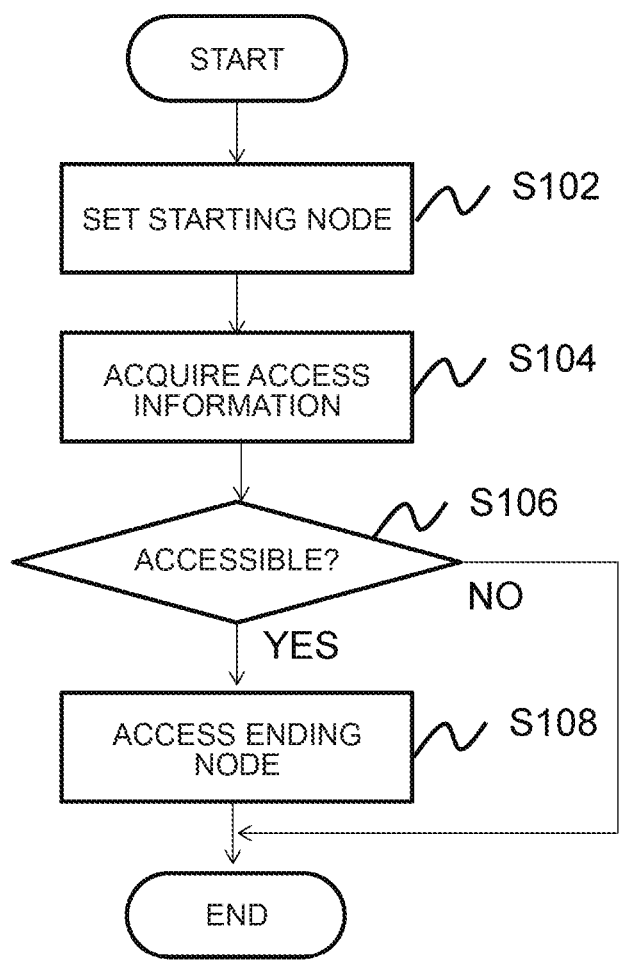
FIG. 10 is a flowchart illustrating an example of the process of a server according to an embodiment.

FIG. 9 illustrates an example of a graph according to the fifth example. In FIG. 9, a method of realizing the access control in the graph illustrated in FIG. 8 without using incomplete access information is illustrated. As indicated by broken-line virtual nodes A, B, and D illustrated in FIG. 9, the nodes A, B, and D in the graph illustrated in FIG. 8 correspond to a partial graph made up of nodes A0 and A1, B0 and B1, and D0 and D1 in the graph illustrated in FIG. 9, respectively.

In the graph illustrated in FIG. 8, it is possible to access all the nodes from the nodes A0 and D0 and access the nodes B1, A1, and D1 only from the nodes E and F. This corresponds to the fact that, in the graph illustrated in FIG. 8, it is possible to access the nodes B, D, E, and F from the node A, access the nodes B, A, E, and F from the node D, and access the nodes B, A, and D only from the nodes E and F.

Here, it is likely that a user frequently accesses the nodes A1, B1, and D1 immediately after accessing the nodes A0, B0, and D0, respectively. Therefore, reading and writing from and to the virtual nodes A, B, and D each had better be done by one single communication with a sharing server. For example, it is preferable that each virtual node is one file or one record of a database in order to improve the processing efficiency (data exchange with the sharing server). By rendering a partial graph comprising multiple nodes that are frequently accessed substantially simultaneously to one file or one record, it is possible to improve the processing efficiency.

<Operation>

Next, an operation of the server 20 will be described. FIG. 9 is a flowchart illustrating an example of the process of the server 20 according to the embodiment. The process illustrated in FIG. 9 is a process executed by the server 20, for example, when a user issues a node-to-node access request by using access information.

In step S102, the control unit 200 sets a starting node.

In step S104, the determining unit 202 acquires access information provided to a user.

In step S106, the determining unit 202 determines whether a completeness condition for the starting node is satisfied by using the access information (whether the starting node can be accessed). When the starting node is accessible (step S106: YES), the flow proceeds to step S108. When the starting node is not accessible (step S106: NO), the restricting unit 206 suspends the access, and the process ends.

In step S108, the permitting unit 204 permits access to the ending node (the next node).

According to the embodiment, it is possible to access various portions of a concealed graph appropriately while suppressing a processing load.

Moreover, each node N of the graph and each link to the node N contain access information for data reachable from the node N, and the node N is concealed. In this way, it is possible to access data reachable from the node N by using the access information for the data reachable from each node N.

That is, when access information that is complete for a node is provided, it is possible to obtain the above-described advantages by repeatedly performing a process of accessing the node according to the access information to obtain access information for an ending node of a link from the node and accessing the same number of nodes as the number of repetition times.

For example, when access information that is complete for the node A is obtained, it is possible to access the nodes B, C, and D by accessing the node A and following the links AB, BC, and CD. Similarly, when access information that is complete for the node A is obtained, it is possible to access the nodes B, C, and D by accessing the node A and following the links AB, AC, and AD. In this example, for the sake of simplicity, it is assumed that any link contains access information that is complete for the ending node thereof.

When the CPU 102 reads a program executed by the information processing device 10 from the ROM 106 and executes the program, one or more units among the above-described respective units are loaded on the RAM 104 and the one or the plurality of units are generated on the RAM 104.

The process described in the above-described embodiment may be realized as a program to be executed by a computer. When this program is installed from a server or the like and is executed by a computer, the above-described process can be realized.

This program may be recorded on the recording medium 116, the recording medium 116 having the program recorded thereon may be read by a computer to realize the above-described process.

Various types of recording media such as a recording medium that records information optically, electrically, or magnetically such as CC-ROM, a flexible disk, or an opto-magnetic disc and a semiconductor memory that records information electrically such as ROM or a flash memory can be used as the recording medium 116.

While the respective examples have been described in detail, the present invention is not limited to the above-described examples but various modifications and changes other than the above-described examples can occur within the scope described in the claims.

REFERENCE SIGNS LIST

20 Information processing device
102 CPU
104 RAM
106 ROM
202 Determining unit
204 Permitting unit
206 Restricting unit
208 Graph editing unit
210 Appending unit
212 Storage unit

What is claimed is:

1. An access management method in which a computer including a control unit performs access management of a graph comprising nodes and directed links between the nodes, wherein
the control unit:
determines, in response to an attempt to access a node N, whether a completeness condition, which indicates that complete access information that is access information with which it is possible to access the node N is available, is satisfied, by combining pieces of access information which have been acquired before accessing the node N;
permits access to the node N when the completeness condition is satisfied; and
suspends access to the node N when the completeness condition is not satisfied.

2. The access management method according to claim 1, wherein
permitting the access involves:
generating the complete access information from one or more pieces of access information when the completeness condition is satisfied; and
revealing information contained in the node N by using the complete access information.

3. The access management method according to claim 1, wherein
when a virtual node containing multiple nodes is formed, writing and reading of data to the virtual node is performed by one single communication.

4. The access management method according to claim 1, wherein
permitting the access involves:
restricting, when rights description data on a right of data user who uses information contained in the node N is obtained, use of the information contained in the node N, on the basis of the rights description data.

5. The access management method according to claim 1, wherein
the control unit further:
generates a node O;
generates a link NO; and
appends, to the link NO, access information that is available on the basis of the completeness condition.

6. An information processing device that performs access management of a graph comprising nodes and directed links between the nodes, the device comprising:
a determining unit that determines, in response to an attempt to access a node N, whether a completeness condition, which indicates that complete access information that is access information with which it is possible to access the node N is available, is satisfied, by combining pieces of access information which have been acquired before accessing the node N;
a permitting unit that permits access to the node N when the completeness condition is satisfied; and
a restricting unit that suspends access to the node N when the completeness condition is not satisfied.

7. A computer-readable non-transitory recording medium comprising program for causing a computer to execute access management of a graph comprising nodes and directed links between the nodes, the program causing the computer to execute the processes of:
determining, in response to an attempt to access a node N, whether a completeness condition, which indicates that complete access information that is access information with which it is possible to access the node N is available, is satisfied, by combining pieces of access information which have been acquired before accessing the node N;
permitting access to the node N when the completeness condition is satisfied; and
suspending access to the node N when the completeness condition is not satisfied.

* * * * *